June 2, 1970     D. V. CURLEY     3,515,374
COMBINED MATERIAL MIXER AND DISTRIBUTOR
Filed Aug. 6, 1968     2 Sheets-Sheet 1
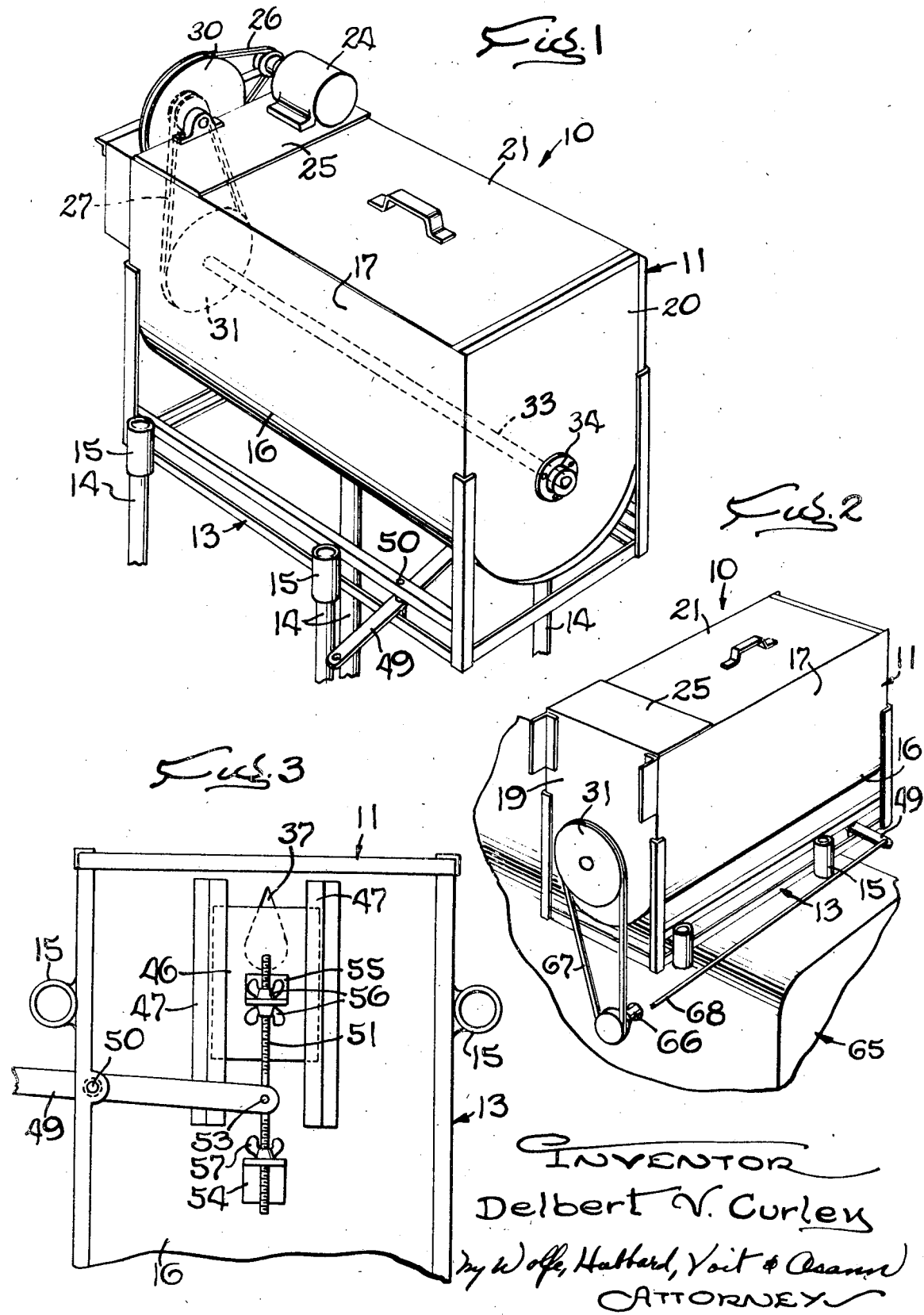
INVENTOR
Delbert V. Curley
by Wolfe, Hubbard, Voit & Osann
ATTORNEY

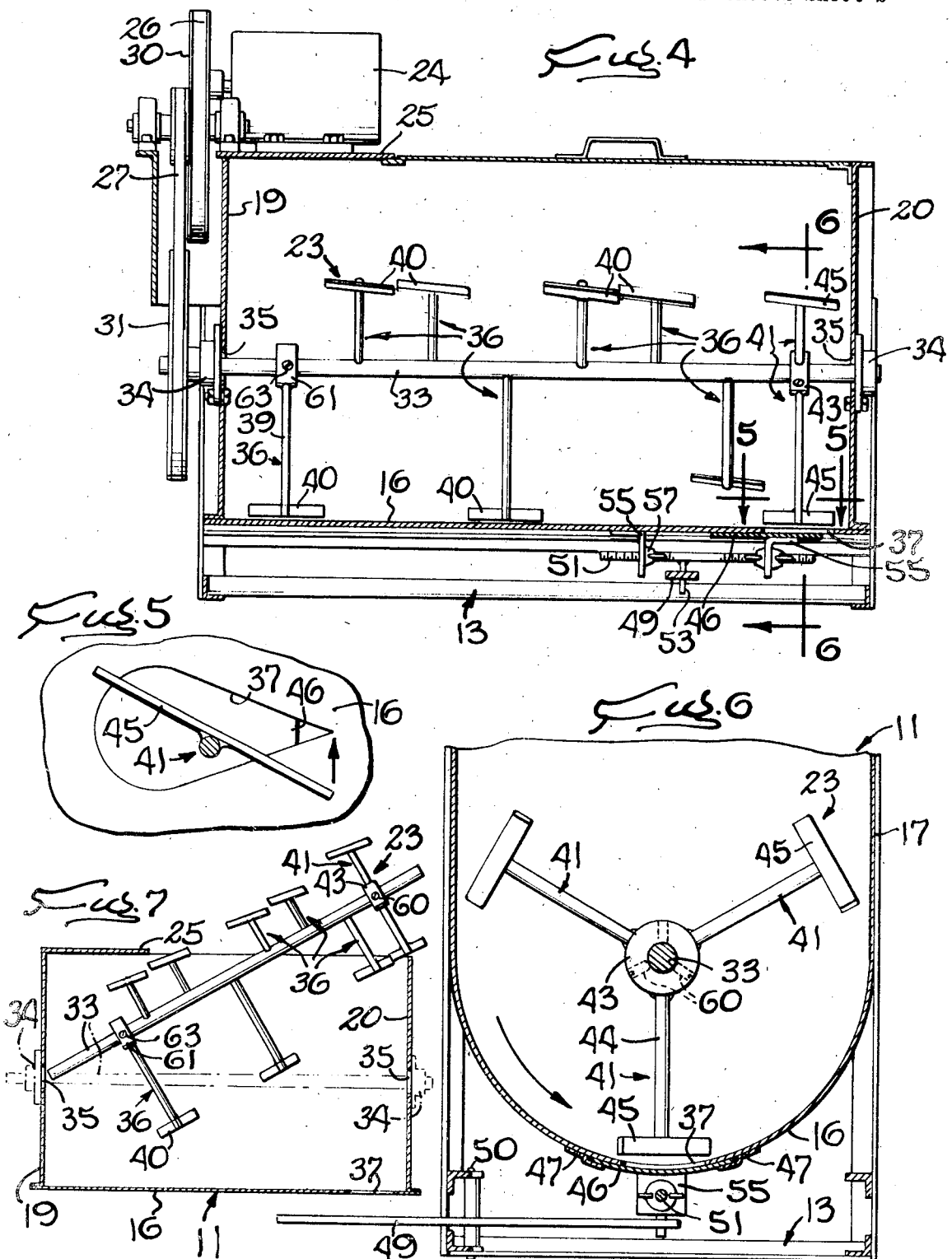

United States Patent Office 3,515,374
Patented June 2, 1970

3,515,374
COMBINED MATERIAL MIXER
AND DISTRIBUTOR
Delbert V. Curley, Box 208, Fulton, Ill. 61252
Filed Aug. 6, 1968, Ser. No. 750,566
Int. Cl. B01f 7/04
U.S. Cl. 259—46                         4 Claims

ABSTRACT OF THE DISCLOSURE

A rotatable auger is located in a trough to mix and stir materials while advancing the materials toward a discharge opening located near one end of the trough. Mounted on and rotatable with the auger is a series of clearing paddles positioned to sweep directly across the discharge opening to prevent the latter from becoming clogged with the material and to force the material through the opening at a relatively uniform rate. A gate valve slidable on the bottom of the trough beneath the opening may be adjusted to uncover different selected areas of the opening thereby to enable changing of the rate of material flow through the opening.

BACKGROUND OF THE INVENTION

This invention relates to a combined mixer and distributor of the type in which materials in a trough are continuously agitated by a rotatable auger as they are advanced toward a discharge opening located near one end of the trough. More particularly, the invention pertains to a mixer and distributor wherein the materials are metered out of the discharge opening at a selected flow rate and are added to other materials in predetermined proportions.

SUMMARY OF THE INVENTION

The primary aim of the present invention is to provide a new, improved and relatively inexpensive material mixer and distributor of the above character which is capable of metering accurately controlled quantities of material through the discharge opening and which is comparatively trouble-free in service use.

A more detailed object is to mount at least one clearing paddle on the auger to sweep directly across the discharge opening in order to force the material through the opening in a positive and uniform manner and to prevent the material from building up around and clogging the opening.

A further object is to control the effective size of the discharge opening with a unique gate valve which accurately governs the flow rate through the opening and which may be easily and conveniently adjusted to change the flow rate.

The invention also resides in the novel manner of mounting the clearing paddle on the auger to facilitate installation of the auger into the trough.

Other objects and advantages of the invention will become apparent from the following detailed description taken in conjunction with the accompanying drawings.

BRIEF DESCRIPTION OF THE DRAWINGS

FIG. 1 is perspective view of a new and improved material mixer and distributor embodying the novel features of the present invention, the mixer being shown supported in a stationary position.

FIG. 2 also is a perspective view of the mixer but showing the latter mounted on a traveling implement.

FIG. 3 is a fragmentary bottom view of the mixer shown in FIG. 1.

FIG. 4 is a fragmentary sectional view of the mixer shown in FIG. 1.

FIG. 5 is an enlarged fragmentary cross-section taken substantially along the line 5—5 of FIG. 4.

FIG. 6 is an enlarged fragmentary cross-section taken substantially along the line 6—6 of FIG. 4.

FIG. 7 is a fragmentary view similar to FIG. 4 but showing the manner of installing the auger in the trough.

DESCRIPTION OF THE PREFERRED EMBODIMENTS

As shown in the drawings for purposes of illustration, the invention is embodied in a combined material mixer and distributor 10 operable to churn and thoroughly mix one or more materials and to discharge the mixture in predetermined quantities at a delivery point. The mixer and distributor shown herein is particularly adapted for agricultural use and is especially suitable for mixing various types of minerals, vitamins, supplements and preservatives and for metering the mixture into silage or grain before the crop is processed and stored.

More particularly, the mixer 10 comprises a generally U-shaped trough 11 formed of sheet metal and cradled in a framework or stand 13 which, in the embodiment shown in FIG. 1, is supported in a stationary position adjacent a silo blower (not shown) by four upstanding legs 14 telescoped removably into sockets 15 attached to the stand. The trough is formed with an arcuate bottom wall 16 and upstanding side walls 17 and is closed at its ends by a pair of end walls 19 and 20 (FIG. 4) which are welded along their margins to the side and bottom walls. The upper end of the trough is open and may be closed by a cover 21 after the various materials to be mixed have been introduced into the trough.

In this instance, the materials are thoroughly mixed with one another within the trough 11 by an elongated auger 23 (FIG. 4) spanning the end walls 19 and 20 and adapted to be rotated about its own axis. In the embodiment shown in FIG. 1, the auger is rotated by an electric motor 24 supported on a platform 25 and connected to the auger by belts 26 and 27 and pulleys 30 and 31, the latter pulley being fastened on one end of the auger. The auger comprises a central shaft 33 extending between the end walls and journaled in bearings 34 (FIG. 4) which are fitted removably into enlarged holes 35 formed in the end walls. Spaced axially along and radiating outwardly from the shaft is a series of mixing and conveying paddles 36 which are operable to churn through and stir the materials while advancing the mixture along the trough from the end wall 19 toward the end wall 20. Upon approaching the end wall 20 the mixture is delivered from the trough through a discharge opening 37 formed in the bottom wall 16 and flows downwardly into the silo blower for distribution within the silage. To churn and convey the materials, each mixing paddle comprises an elongated arm 39 whose inner end is attached to the shaft and whose outer end supports a relatively flat mixing blade 40. Each of the mixing blades is inclined at an angle of approximately 30 degrees to the axis of the shaft and is canted so as to propel the mixture from the end wall 19 toward the end wall 20 as the shaft rotates. Adjacent paddles are spaced angularly from one another around the shaft with the spacing between each pair of paddles being approximately 120 degrees such that the mixing blades 40 form a helical arrangement much like a screw and successively push the mixture toward the opening 37 for discharge out of the trough.

According to the present invention, at least one clearing paddle 41 is mounted on the shaft 33 to sweep directly across the entire area of the discharge opening 37 in order to force or channel the advancing mixture downwardly through the opening in a positive manner and to prevent the mixture from accumulating around and clogging up the opening. As a result, the rate of flow through the discharge opening may be maintained at a relatively constant value at all times to insure that a proper quantity of mixture will be metered into the silage.

In the preferred form of the invention, three of the clearing paddles 41 (see FIGS. 4 and 6) are positioned to sweep successively across the discharge opening 37 in order to continuously force the mixture into the opening as the mixture is advanced along the bottom wall 16 of the trough 11. The clearing paddles are identical in construction to the mixing paddles 36 and are spaced angularly and equally about a hub 43 fastened to the shaft 33, each clearing paddle comprising a radially extending arm 44 and a canted sweeping blade 45. As the shaft rotates, the sweeping blades 45 follow one another directly across the entire area of the discharge opening in close proximity to the bottom wall 16 to shove the mixture positively into the opening and also to prevent the mixture from accumulating or building up around the opening. In this way, the opening is not clogged and reduced in size, and thus the size of the opening remains the same during sustained use of the mixer to insure that the flow rate will remain constant without need of repeatedly stopping the mixer and clearing the opening.

Selectively adjustable means are provided for changing the effective size of the discharge opening 37 to enable the rate of flow through the opening to be varied within a wide range. Herein, this means comprises a gate valve 46 (FIGS. 3 and 4) guided for back and forth sliding on the underside of the bottom wall 16 in underlying relation with the discharge opening 37 and selectively slidable to positions uncovering various areas of the opening thereby to enable controlled metering of the quantity of material discharged through the opening in any given time. Preferably, the gate valve is in the form of a metal plate curved in accordance with the curvature of the bottom wall 16 and held slidably against the bottom wall by a pair of guides 47 (FIG. 3) extending along and welded to the underside of the bottom wall. By sliding the gate valve to different positions in the guides, different selected areas of the discharge opening may be uncovered to change the flow rate through the opening and thus effect accurate proportioning of the mixture into the silage.

Advantageously, a lever 49 (FIGS. 3 and 4) accessible from the outer side of the trough 11 is connected to the gate valve 46 to enable quick and convenient positioning of the latter. As shown most clearly in FIG. 3, the lever is pivoted intermediate its ends to the stand 13 by a pin 50 and is connected pivotally at its inner end to a threaded rod 51 as indicated at 53. The rod is guided slidably at one end by a stop or bracket 54 fastened to the underside of the trough and is fixed at its other end to the gate valve by a bracket 55 and a pair of wing nuts 56. By swinging the lever back and forth about the pin 50, the gate valve may be slid to any desired position relative to the discharge opening 37. A stop in the form of a wing nut 57 is threaded onto the rod adjacent the bracket 54 to engage the latter and limit the extent to which the valve may be slid to uncover the opening. By adjusting the wing nut 57 along the rod 51, the point of engagement of the nut with the bracket may be varied to change the limit position of the valve. Once the nut 57 has been set, the valve automatically will be opened to the same position each time the lever is swung about the pin.

In another aspect, the invention contemplates mounting the clearing paddles 41 for adjustment along the shaft 33 to enable installation of the auger 23 into the trough 11 after the end walls 19 and 20 have been welded to the side walls 17 and the bottom wall 16. As shown in FIG. 7, installation of the shaft is effected by placing the shaft in the trough at an angle, sliding one end of the shaft through the opening 35 in the end wall 19, and thereafter lowering the shaft to a horizontal position and sliding the other end of the shaft into the opening 35 in the end wall 20 before attaching the bearings 34 to the end walls and the shaft. With the clearing paddles 41 located on the shaft to sweep across the discharge opening 37, the paddles would engage the end wall 20 and prevent the shaft from being lowered into the trough.

Accordingly, the hub 43 is mounted for axial adjustment on the shaft 33 so that, prior to insertion of the shaft into the trough 11, the clearing paddles 41 may be slid inwardly along the shaft so as not to interfere with the end wall 20 when the shaft is lowered. After the shaft has been installed, the clearing paddles may be slid outwardly along the shaft to their normal position overlying the discharge opening 37 and may be anchored in such position by set screws 60 (FIG. 6) extending through the hub. With this arrangement, the discharge opening 37 and the clearing paddles 41 may be located adjcent the end wall 20 to avoid wasted space within the trough and yet the auger 23 may be installed in the trough after the end walls have been welded into place. Preferably, the initial mixing paddle 36 adjacent the end wall 19 is secured to the shaft 33 by a hub 61 (FIG. 4) and set screws 63 and may be temporarily adjusted inwardly along the shaft if additional clearance should be needed to lower the shaft into the trough.

Instead of being mounted on the legs 14, the mixer 10 with the stand 13 may be supported on an implement such as a baler 65 (FIG. 2) to discharge the mixed materials into moist hay just before the latter enters the baling chamber of the implement. With this type of mounting, the auger 23 may be driven from an auxiliary P.T.O. shaft 66 of the baler by means of a belt 67 trained around the pulley 31. Also, an elongated operating rod 68 may be attached to the lever 49 to enable the position of the gate valve 46 to be controlled from the tractor or from the side of the baler.

I claim as my invention:

1. In a material mixer and distributor, the combination of, a mixing trough for holding materials to be mixed and formed by a bottom wall and by upstanding end and side walls, a power-rotated shaft extending between and journaled in said end walls and carrying a series of axially spaced mixing and conveying paddles, said paddles being spaced angularly from one another about said shaft and all being inclined in the same general direction relative to the axis of the shaft to churn through the material and to advance the latter from one end wall of the trough toward the other end wall in response to rotation of the shaft, a material discharge opening formed in the bottom wall of the trough near the downstream end wall and beyond the furthermost downstream one of said mixing and conveying paddles, a gate valve guided for back and forth sliding on the underside of said bottom wall in underlying relation with said discharge opening and selectively slidable to positions uncovering various selected areas of the opening to enable controlled metering of the quantity of material discharged through the opening, and three clearing paddles mounted on and angularly spaced about said shaft and each rotatable directly across the entire area of said discharge opening to sweep the material through the opening and to prevent the material from accumulating adjacent the opening.

2. A material mixer and distributor as defined in claim 1 further including a hub telescoped over said shaft and supporting all three of said clearing paddles, said hub being adjustable axially along said shaft to permit axial shifting of said clearing paddles for purposes of facilitating installation of said shaft into said trough.

3. A material mixer and distributor as defined in claim 1 in which the mixing paddle adjacent the upstream end wall of the trough is mounted for adjustment axially of said shaft for purposes of facilitating installation of said shaft into said trough.

4. A material mixer and distributor as defined in claim 1 further including a swingable operating lever projecting outwardly from the bottom wall of said trough and pivotally connected to said gate valve whereby the latter may be slid back and forth across said discharge opening by swinging said lever, stops located on said gate valve and on the bottom wall of said trough and engageable with one another to limit the extent the gate valve may be slid to uncover said opening, one of said stops being adjustable toward and away from the other of said stops to enable changing of the point of engagement of the stops and thereby permit changing of the extent of sliding of said valve.

References Cited
UNITED STATES PATENTS

| | | | |
|---|---|---|---|
| 221,364 | 11/1879 | Ruger | 259—45 |
| 560,259 | 5/1896 | Day | 259—45 |
| 2,856,165 | 10/1958 | Gordtney | 259—46 X |
| 3,346,239 | 10/1967 | Larson | 259—45 |

ROBERT W. JENKINS, Primary Examiner